United States Patent [19]

Wagner

[11] Patent Number: 4,919,168
[45] Date of Patent: Apr. 24, 1990

[54] VALVE ARRANGEMENT

[75] Inventor: Wilfried Wagner, Huettenberg/W, Fed. Rep. of Germany

[73] Assignee: Alfred Teves GmbH, Frankfurt am Main, Fed. Rep. of Germany

[21] Appl. No.: 264,129

[22] Filed: Oct. 28, 1988

[30] Foreign Application Priority Data

Nov. 20, 1987 [DE] Fed. Rep. of Germany ....... 3739337

[51] Int. Cl.$^5$ .......................................... F15B 13/043
[52] U.S. Cl. .................................. 137/627.5; 137/907; 303/119
[58] Field of Search ............................ 137/627.5, 907; 303/119; 251/30.01

[56] References Cited

U.S. PATENT DOCUMENTS

| 2,154,171 | 4/1939 | Kuiper | 137/907 X |
| 2,991,762 | 7/1961 | Price et al. | 137/627.5 |
| 3,064,670 | 11/1962 | Peras | 137/627.5 X |
| 3,118,470 | 1/1964 | Peras | 137/627.5 |
| 3,252,471 | 5/1966 | Olson | 137/627.5 X |
| 3,907,379 | 9/1975 | Lawson | 137/627.5 X |
| 3,945,401 | 3/1976 | Greenwood | 137/627.5 |
| 4,079,753 | 3/1978 | Popp | 137/627.5 |
| 4,534,375 | 8/1985 | Fox | 137/907 X |
| 4,840,193 | 6/1989 | Schiel | 137/627.5 |

FOREIGN PATENT DOCUMENTS 897521  5/1962  United Kingdom ............. 137/627.5

Primary Examiner—Gerald A. Michalsky
Attorney, Agent, or Firm—Robert P. Seitter

[57] ABSTRACT

A valve arrangement is disclosed including a housing in which an electromagnetically actuatable preliminary control valve for controlling a differential pressure and a main valve which is actuatable by the differential pressure are arranged and whose closing element provides for a selective connection between an outlet connection and at least one inlet connection. The valve arrangement is adapted for use in automotive vehicles without additional pressure fluid sources, by providing for the main valve to be changed over by means of a movable wall experiencing a balanced pressure in the rest position and which is pressurizable by the differential pressure.

9 Claims, 1 Drawing Sheet

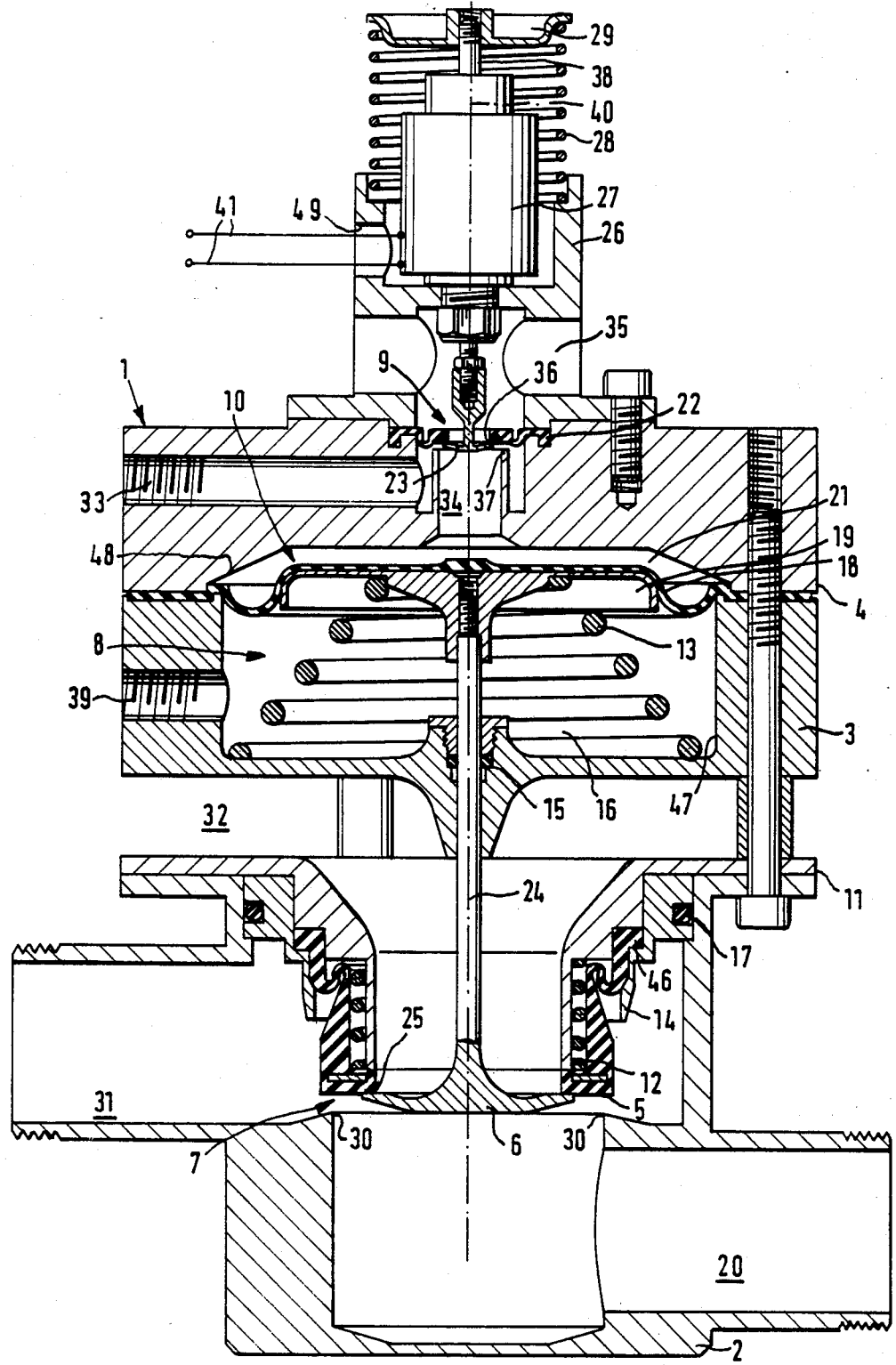

4,919,168

VALVE ARRANGEMENT

BACKGROUND OF THE INVENTION

This invention is related to a valve arrangement of the type comprised of a housing in which an electromagnetically actuatable preliminary control valve for controlling a differential pressure and a main valve actuatable by the differential pressure are arranged and whose closing element provides for selectively connecting an outlet connection with at least one inlet connection.

A valve arrangement of this kind is illustrated, for example, in a publication of Messrs. MAC Valves Europe Inc. That arrangement is provided with an electromagnetically actuatable preliminary control valve with the aid of which the supply of a pressurized pressure fluid, such as compressed air, to a piston of a main valve is controlled. The piston in this device is guided in a sealed manner within a bore and presents two sealing edges which by interaction with two sealing seats either establish or shut off a connection between a first, a second and a third connection, respectively.

In this known valve arrangement, it is a significant disadvantage to have to provide a compressed air source which makes the valve arrangement less suited for use in automotive vehicles in which there is no readily available compressed air source but rather only a vacuum source.

The relatively long change-over times of this prior art valve arrangement which are due to the friction caused during the motion of the heavy piston is also regarded as a shortcoming.

SUMMARY OF THE INVENTION

The invention has therefore, the objective to provide for an improved valve arrangement of the kind mentioned which allows it to be employed in automotive vehicles without utilization of additional fluid sources. At the same time, the valve arrangement must be of simple design, easy to manufacture and include components which can be manufactured at low cost.

According to the invention, this objective is achieved by providing for the main valve to be changed over by means of a movable wall which is in a pressure balanced state when at rest and which is pressurizable by a differential pressure. An extremely low-noise operation of the inventive valve arrangement is obtained by this provision.

Preferably, the housing of the valve arrangement is subdivided into a valve housing and a control housing.

According to an advantageous embodiment of the invention, the movable wall is formed by a diaphragm inserted between the vacuum housing and the control housing and by a diaphragm dish which is pre-tensioned by a return spring and which is engaged by a tappet for actuating the main valve. The tappet is guided within the vacuum housing and is furnished with a valve disk at which a first sealing seat of the main valve is provided. In this way, the functional reliability of the valve arrangement according to the invention is considerably increased since the risk of clamping of the tappet is largely avoided.

According to another advantageous feature of the invention, the electromagnet, the preliminary control valve the movable wall and the main valve have a common axis of symmetry. This provides for an especially compact design.

According to a still further particularly advantageous feature of the present invention, the closing element of the main valve is formed by an axially symmetrical elastic valve element which is pre-tensioned in the direction of the sealing seats by means of a valve spring, is retained in the valve housing between a holder and a retaining ring and is sealed in the valve housing by means of an 0-ring. This feature provides for a major reduction in the change-over times of the valve arrangement.

According to another advantageous feature of the invention, the preliminary control valve is formed by a first valve seat, a second valve seat and by a valve closing element and is actuatable by means of an electromagnet which is disposed in a guide Cover. The valve closing element is formed by an elastic valve plate which is pre-tensioned in the direction of the two valve seats and is retained at its peripheral margin between the housing and the guide cover.

In accordance with a further feature of the invention the main valve shuts off or opens a connection between the outlet connection and a vacuum inlet to an atmospheric inlet. In an intermediate position of the valve element during actuation the two sealing seats are closed simultaneously.

This provision advantageously prevents a momentary connection of all connections in an intermediate position of the piston such as occurs in the prior-art valve arrangement and which would have a negative effect on operation, and in particular, when the valve arrangement is utilized as a change-over valve in a vacuum-assisted antilocking brake system since a strong vacuum leak occurs at the moment of valve change-over resulting in a considerable increase in the vacuum volume required.

BRIEF DESCRIPTION OF THE DRAWING

The present invention will be described in detail with reference to the drawing which is a longitudinal cross section of the inventive valve arrangement showing details of construction.

DETAILED DESCRIPTION OF A PREFERRED EMBODIMENT

A valve housing 2 includes an inlet connection, i.e. a vacuum inlet 31, and an outlet connection 20 which communicate in the rest position of the valve. At the passage between the two connections, a second ring-shaped sealing seat 30 of the main valve 7 is provided within the valve housing 2. The sealing seat 30 is positioned coaxially with a first sealing seat 25 provided at a valve disk 6 which is actuatable by a tappet 24. In the rest position of the valve arrangement, the first sealing seat 25 interacts with a closing element which is preferably formed by an axially symmetrical elastic valve element 5 and is pre-tensioned in the direction of the two sealing seats 25, 30 by means of a valve spring 12. Preferably, the valve element 5 is arranged within the valve housing 2 in such a way that the valve element 5 is retained at its end facing away from the valve disk 6 between a holder 11 and a retaining ring 14 which is sealed off against the valve housing 2 by means of a sealing ring 46. A second inlet connection or atmospheric inlet 32 is formed by an annular chamber being open toward the outside and situated between the valve housing 2 and the succeeding vacuum housing 3 in which the tappet 24 is slidably guided and sealed off by a sleeve 15 inserted in a groove.

The vacuum housing 3 is formed with an axial recess 47 which together with a coaxial recess 48 in the control housing 4' delimits a cavity 8 accommodating a movable wall 10 whiCh divides the cavity 8 into a vacuum chamber 16 and a power chamber 21. In this configuration, the movable wall 10 includes a diaphragm 18 inserted between the control housing 4 and the vacuum housing 3 and of a diaphragm dish 19 pre-tensioned by a return spring 13 and engaged by the tappet 24 which actuates the main valve 7. Through a first vacuum duct 39, the vacuum chamber 16 communicates with a vacuum source which is not shown in the drawing. In the rest position, the power chamber 21 delimited by the movable wall 10 communicates, through a flow duct 34, with a second vacuum duct 33 formed in the control housing 4. The second vacuum duct 33 is also connected to the forementioned vacuum source. At the end of the flow duct 34, a second valve seat 37 of the preliminary control valve 9 is located within the housing :. The second valve seat 37 is closed by an elastic valve plate 22 on actuation of the preliminary control valve 9 by means of an electromagnet 27. In the rest position, the valve plate 22 interacts with a first valve seat 36 of the preliminary control valve 9 which is located at a second valve disk 23, thereby shutting off a connection between an atmospheric duct 35 and the flow duct 34 and the power chamber 21, respectively. The second valve disk 23 is connected with an armature (not shown in the drawing) of the electromagnet 27 which is positioned in a guide cover 26 flanged to the control housing 4. The guide cover 26 in which the atmospheric duct 35 is provided presents a through opening 49 through which current supply lines 41 of the electromagnet 27 are introduced. Finally, at its end facing away from the preliminary control valve 9, the armature is formed with an axial extension 3B bearing a spring retainer 29. Between the spring retainer 29 and the guide cover 26, a compression spring 2B is inserted which pre-tensions the first valve seat 36 of the preliminary control valve 9 against the valve plate 22 in the rest position of the valve arrangement, assuring a firm closure of the valve seat 36. The electromagnet 27, the preliminary control valve 9, the movable wall 10 and the main valve 7 are arranged such as to have a common axis of symmetry 40.

The mode of operation of the inventive valve arrangement is as follows:

When the electromagnet 27 is in the de-energized condition, the preliminary control valve 9, the movable wall 10 and the main valve 7 will be in the rest position which is shown in the drawing so that there will exist a connection between the vacuum inlet 31 and the outlet connection 20 and the power chamber 21 will be connected to the second vacuum duct 33 through the open second valve seat 37 so that the whole cavity B will be under vacuum and the movable wall 10 will be under a pressure balance condition. Now, energizing the winding of the electromagnet 27, a force will act on the armature which must exceed the restoring force exerted by the compression spring 28 which retains the first valve seat 36 of the preliminary control valve 9 at the valve plate 22. Under the effect of the magnetic force, the armature will move in a downward direction as viewed in the drawing thereby relieving the pre-tensioned valve plate 22 which will then move toward the second valve seat 37 closing it and interrupting the connection between the power chamber 21 and the second vacuum duct 33. The aforementioned closing procedure will immediately be followed by the second valve disk 23, and the first valve seat 36, being lifted off from the valve plate 22. In this way, the evacuated power chamber 21 will be vented to atmosphere so that due to the differential pressure existing in the cavity B, an actuating force directed downward, as viewed in the drawing will be created which will be directly proportional to the active area of the movable wall 10 and which will overcome the spring force of the return spring 13. Under the effect of the actuating force, the tape& 24 will slide downward, and this motion will be followed by the pre-tensioned valve element 5 of the main valve 7 so that the first sealing seat 25 will remain closed during the initial phase of the change-over procedure.

In a subsequent intermediate position, the second sealing seat 30, will also be closed, whereupon the first sealing seat 25 will be lifted off from the valve element 5, in the course of further movement. This terminates the change-over operation of the valve arrangement, and a connection will be established between the atmospheric inlet 32 and the outlet connection 20. 0n cutting off the voltage supply to the magnet coil, the described procedure will take place in the reverse sequence.

It will be appreciated from the above description that the change-over paths of the two valves which are independent of each other provide for a small-size electromagnet to be used because the stroke and force required to operate the second valve disk 23 of the preliminary control valve 9 can be minimized by changing the diameter of the disk 23 as desired. In addition, the change-over force of the main valve 7 can be changed as desired since the size of the movable wall 10 is also freely selectable.

What is claimed is:

1. A valve arrangement comprising a housing, electromagnetically actuatable preliminary control valve means for controlling a differential pressure in said housing, a main valve in said housing, said main valve actuatable by the differential pressure, said main valve including a closing element for selectively connecting an outlet connection and at least one inlet connection, wherein said main valve is connected to a movable wall and is exposed to a balanced pressure thereacross in a rest condition, said wall being pressurizable by the differential pressure to change over said main valve, wherein said housing of the valve arrangement is subdivided into a valve housing, a vacuum housing and a control housing, said movable wall being arranged in a cavity which is located between said vacuum housing and said control housing, said movable wall subdividing said cavity into a vacuum chamber and a ventable power chamber, wherein said movable wall is formed by a diaphragm which is inserted in said housing between said vacuum housing and said control housing and by a diaphragm dish which is pre-tensioned by a return spring and which is engaged by a main valve actuating tappet, wherein said tappet is guided within said vacuum housing and is provided with a first valve disk at which a first sealing seat of said main valve is located, wherein said first sealing seat is arranged coaxially with a second sealing seat provided in said valve housing, said first sealing seat contacted by said closing element of said main valve in the rest position, wherein said closing element is formed by an axially symmetrical elastic valve element which is pre-tensioned in a direction toward said first and second sealing seats by means of a valve spring.

2. A valve arrangement comprising a housing, electromagnetically actuatable preliminary control valve means for controlling a differential pressure in said housing, a main valve in said housing, said main valve actuable by the differential pressure, said main valve including a closing element for selectively connecting an outlet connection and at least one inlet connection, wherein said main valve is connected to a movable wall and is exposed to a balanced pressure thereacross in a rest condition, said wall being pressurizable by the differential pressure to change over said main valve, wherein said housing of the valve arrangement is subdivided into a valve housing, a vacuum housing and a control housing, wherein said movable wall is arranged in a cavity which is located between said vacuum housing and said control housing, said movable wall subdividing said cavity into a vacuum chamber and a ventable power chamber, wherein said movable wall is formed by a diaphragm which is inserted in said housing between said vacuum housing and said control housing and by a diaphragm dish which is pre-tensioned by a return spring and which is engaged by a main valve actuating tappet, wherein said tappet is guided within said vacuum housing and is provided with a first valve disk at which a first sealing seat of said main valve is located, wherein said first sealing seat is arranged coaxially with a second sealing seat provided in said valve housing, said first sealing seat contacted by said closing element of said main valve in the rest position, wherein said valve element is retained in said valve housing between a holder attached to said valve housing and a retaining ring in said housing, said retaining ring being sealed off from said valve housing by an O-ring between said retaining ring and said housing.

3. The valve arrangement as claimed in claim 2, wherein said main valve shuts off or opens a connection between said outlet connection and a vacuum inlet and an atmospheric inlet respectively, said two sealing seats of said valve element being closed simultaneously in an intermediate position of said valve element.

4. The valve arrangement as claimed in claim 3, wherein said preliminary control valve means includes a first valve seat, a second valve seat and a valve closing element, said preliminary control valve means is actuatable by means of an electromagnet which is disposed in a guide cover.

5. The valve arrangement as claimed in claim 4, wherein said first valve seat is arranged at a second valve disk, said second valve disk being in connection with the armature of said electromagnet and arranged coaxially with said second valve seat delimiting a flow duct leading to said power chamber.

6. The valve arrangement as claimed in claim 5, wherein said valve closing element is formed by an elastic valve plate which is pre-tensioned in a direction of the said first and second valve seats, said valve plate retained at its peripheral margin between said control housing and said guide cover.

7. The valve arrangement as claimed in claim 6, wherein said armature of the said electromagnet includes an extension which includes an axial spring retainer, a compression spring being provided between said spring retainer and said guide cover for pre-tensioning said armature.

8. The valve arrangement as claimed in claim 7, wherein said electromagnet, said preliminary control valve, said movable wall and said main valve have a common axis of symmetry.

9. The valve arrangement as claimed in claim 4, wherein said guide cover includes a through opening through which current supply lines to the electromagnet are introduced.

* * * * *